Nov. 1, 1938.　　　　J. A. NORLING　　　　2,135,197
ANAGLYPH STEREOSCOPY
Filed March 16, 1937
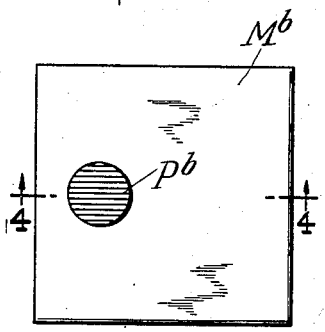
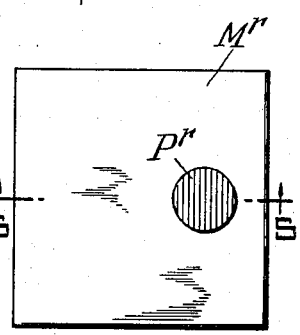
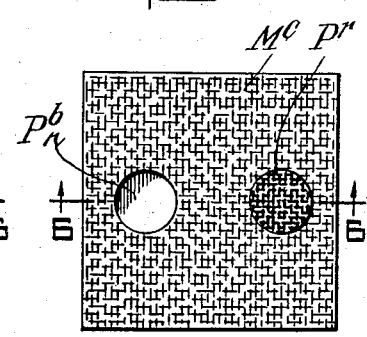
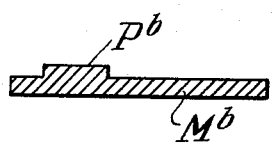
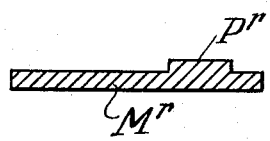
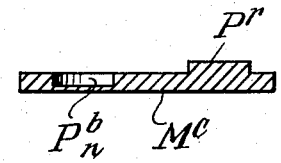
INVENTOR.
John A. Norling
BY Kenyon & Kenyon
ATTORNEYS.

Patented Nov. 1, 1938

2,135,197

UNITED STATES PATENT OFFICE 2,135,197

ANAGLYPH STEREOSCOPY

John A. Norling, New York, N. Y.

Application March 16, 1937, Serial No. 131,113

4 Claims. (Cl. 88—29)

This invention relates to anaglyph stereoscopy.

In anaglyph stereoscopy, right eye and left eye pictures are printed on a suitable medium in two different colors, usually but not necessarily red and blue and are viewed through spectacles, having one lens or filter of one color and one lens or filter of another color. If the anaglyph print is made up of red and blue images then the spectacles are usually provided with red and blue lenses or filters. The stereoscopic effect is obtained by elimination of the blue image and conversion of the red image to black when viewed through the blue filter and elimination of the red image and conversion of the blue image to black when viewed through the red filter.

Inks, pigments and dyes commonly used in printing the red and blue pictures are not pure colors and as a result, the filters do not effect complete elimination of the blue image nor complete conversion of the red image to black. Therefore, a residual image or ghost image of the blue picture will appear to the eye looking through the blue filter and the red picture which that eye should see as black will appear violet or purple instead of black.

An object of this invention is to produce anaglyph stereoscopic prints which overcome the disadvantages above set forth.

Commercially available colors in inks, pigments and dyes are not pure colors, and this lack of purity of color is particularly evident in blue inks, pigments and dyes which may contain an admixture of green, red, orange, yellow or black. It is this colored admixture which is responsible for the failure of the blue filter to eliminate the blue image. The red image, if composed of a mixture of red with any other color, or colors, for instance blue, will not appear black when viewed through the blue filter. If the red image is printed in magenta which is a mixture of red and blue, the usual color used in printing from the red-printing plate or matrix, the image will appear purple or violet instead of black when viewed through the blue filter.

The object of this invention is attained by superposing a negative imprint in yellow of the picture, the positive of which is printed in blue in registration with the blue picture, such negative imprint being of just sufficient intensity (when viewed through the blue filter) to balance the intensity of the residual trace of the blue image when viewed through the blue filter and superposing on the magenta a positive imprint in yellow of the picture printed in magenta such imprint being of just sufficient intensity to complement the blue component of the magenta image and effect satisfactory conversion of the magenta picture to a black image when viewed through the blue filter.

Other objects, novel features and advantages of this invention will become apparent from the following specification and accompanying drawing, wherein:

Figs. 1 to 3 inclusive are plan views of the matrices used in printing a picture in accordance with the invention, and Figs. 4 to 6 inclusive are vertical views through Figs. 1 to 3 inclusive.

Figs. 1 and 4 illustrate the matrix $M^b$ on which is formed in relief a positive $P^b$ of the picture which is to be printed in blue. Figs. 2 and 5 illustrate the matrix $M^r$ on which is formed in relief a positive $P^r$ of the picture which is to be printed in magenta. Figs. 3 and 6 illustrate the matrix $M^c$ on which is combined a negative $P^b{}_n$ of the picture which is to be printed in blue and a positive of $P^r$ of the picture which is to be printed in magenta.

The matrix $M^b$ is first used to print the blue picture, after which the matrix $M^r$ is used to print the magenta picture and finally the matrix $M^c$ is used to add the required yellow, not necessarily in that order. As indicated in Fig. 1, blue ink, pigment or dye is supplied to the positive $P^b$ of the matrix $M^b$ and the blue picture is printed in the usual manner. As indicated in Fig. 2, magenta ink, pigment or dye is supplied to the positive $P^r$ of the matrix $M^r$ and the red picture is printed in the usual manner. As indicated in Fig. 3, yellow ink, pigment or dye is supplied to the matrix $M^c$ including the negative $P^b{}_n$ and the positive $P^r$ in sufficient intensity to supply to the finished print the yellow required to effect virtual elimination of the blue picture when viewed through a blue filter and the conversion of the magenta picture to black when viewed through the blue filter. The picture may be printed on any suitable medium such, for example, as paper or film depending upon whether it is intended to view the picture by transmitted or reflected light or by projection on a screen. Also the order of printing with the various matrices may be varied from that above set forth.

I claim:

1. In the method of producing a print for use in anaglyph stereoscopy wherein left eye and right eye pictures are printed one in magenta and the other in blue, the improvement which comprises superposing on the blue picture a yellow negative thereof of sufficient intensity to eliminate said picture when viewed through a blue filter.

2. In the method of producing a print for use in anaglyph stereoscopy wherein left eye and right eye pictures are printed one in magenta and the other in blue, the improvement which comprises superposing on the blue picture a yellow negative thereof of sufficient intensity to eliminate said picture when viewed through a blue filter, and superposing on the magenta picture a yellow positive thereof of sufficient intensity to yield a black image when viewed through a blue filter.

3. In the method of producing a print for use in anaglyph stereoscopy wherein left eye and right eye pictures are printed one in magenta and the other in blue, the improvement which comprises superposing on the magenta picture a yellow positive thereof of sufficient intensity to yield a black image when viewed through a blue filter.

4. In the method of producing a print for use in anaglyph stereoscopy wherein left eye and right eye pictures are printed one in magenta and the other in blue, the improvement which comprises superposing on the blue picture a negative in complementary color of sufficient intensity to eliminates said picture when viewed through a blue filter.

JOHN A. NORLING.